United States Patent
Kwak et al.

(10) Patent No.: US 10,351,927 B2
(45) Date of Patent: *Jul. 16, 2019

(54) HOT-ROLLED STEEL SHEET FOR HIGH STRENGTH GALVANIZED STEEL SHEET, HAVING EXCELLENT SURFACE QUALITY, AND METHOD FOR PRODUCING SAME

(71) Applicant: POSCO, Pohang-si, Gyeongsangbuk-do (KR)

(72) Inventors: Hyo Jung Kwak, Gwangyang-si (KR); Young-Ha Kim, Gwangyang-si (KR); Seok Jong Seo, Jeonju-si (KR)

(73) Assignee: POSCO, Pohang-si, Gyeongsanbuk-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/533,609

(22) PCT Filed: Dec. 24, 2014

(86) PCT No.: PCT/KR2014/012849
§ 371 (c)(1),
(2) Date: Jun. 6, 2017

(87) PCT Pub. No.: WO2016/104838
PCT Pub. Date: Jun. 30, 2016

(65) Prior Publication Data
US 2017/0342522 A1    Nov. 30, 2017

(30) Foreign Application Priority Data
Dec. 22, 2014   (KR) .................. 10-2014-0185992

(51) Int. Cl.
*C21D 9/46* (2006.01)
*C21D 8/02* (2006.01)
(Continued)

(52) U.S. Cl.
CPC .............. *C21D 9/46* (2013.01); *B32B 15/013* (2013.01); *B32B 15/04* (2013.01); *B32B 15/043* (2013.01);
(Continued)

(58) Field of Classification Search
CPC ................ C21D 8/02; C21D 2211/005; C21D 2211/002; C21D 2211/004; C21D 9/46;
(Continued)

(56) References Cited

U.S. PATENT DOCUMENTS

2002/0088510 A1    7/2002   Nagataki et al.
2015/0292054 A1*  10/2015   Kami .................. C21D 8/0226
                                                 52/831
2017/0342529 A1*  11/2017   Kim ......................... C21D 8/02

FOREIGN PATENT DOCUMENTS

CA    2869700 A1    10/2013
CN    102227512 A   10/2011
(Continued)

OTHER PUBLICATIONS

Chinese Office Action dated Mar. 19, 2018 issued in Chinese Patent Application No. 201480084262.9.
(Continued)

*Primary Examiner* — Michael E. La Villa
(74) *Attorney, Agent, or Firm* — Morgan Lewis & Bockius LLP

(57) ABSTRACT

The present invention relates to a hot-rolled steel sheet for a high strength galvanized steel sheet, having excellent surface quality, and a method for producing the same, the hot-rolled steel sheet comprising, by weight %: C: 0.05 to 0.15%, Si: 0.03 to 0.10%, Mn: 0.7 to 1.39%, P: 0.001 to 0.05%, S: 0.001 to 0.03%, Al: 0.002 to 0.035%, and the remainder being Fe and unavoidable impurities. The weight ratio of Mn/Si is 15 to 25, the weight ratio of C/Si is 1 to 5,
(Continued)

and the weight ratio of Si/P is 3 to 10. The hot-rolled steel sheet has a microstructure consisting of, in area fraction, 10 to 40% of bainite, 20 to 30% of pearlite and 40 to 60% of ferrite, and includes a ternary eutectic compound of FeO, $Fe_2SiO_4$ and $Fe_3(PO)_4$ formed within 50 μm from the surface.

9 Claims, 3 Drawing Sheets

(51) Int. Cl.
| | |
|---|---|
| C23C 2/06 | (2006.01) |
| C22C 38/14 | (2006.01) |
| C22C 38/02 | (2006.01) |
| C22C 38/06 | (2006.01) |
| C22C 38/04 | (2006.01) |
| C22C 38/00 | (2006.01) |
| C22C 38/12 | (2006.01) |
| C23F 17/00 | (2006.01) |
| B32B 15/01 | (2006.01) |
| C22C 38/26 | (2006.01) |
| C22C 38/42 | (2006.01) |
| C22C 38/40 | (2006.01) |
| C22C 38/18 | (2006.01) |
| C22C 38/08 | (2006.01) |
| C22C 38/16 | (2006.01) |
| C22C 38/24 | (2006.01) |
| C22C 38/28 | (2006.01) |
| C22C 38/22 | (2006.01) |
| C22C 38/20 | (2006.01) |
| C22C 38/48 | (2006.01) |
| C23C 28/02 | (2006.01) |
| C22C 38/46 | (2006.01) |
| C23C 28/00 | (2006.01) |
| C22C 38/50 | (2006.01) |
| C23C 30/00 | (2006.01) |
| C22C 38/44 | (2006.01) |
| B32B 15/18 | (2006.01) |
| B32B 15/04 | (2006.01) |
| C23C 2/02 | (2006.01) |
| C23C 2/40 | (2006.01) |

(52) U.S. Cl.
CPC ............... *B32B 15/18* (2013.01); *C21D 8/02* (2013.01); *C21D 8/0205* (2013.01); *C21D 8/0226* (2013.01); *C21D 8/0278* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C23C 2/02* (2013.01); *C23C 2/06* (2013.01); *C23C 2/40* (2013.01); *C23C 28/023* (2013.01); *C23C 28/025* (2013.01); *C23C 28/3225* (2013.01); *C23C 30/00* (2013.01); *C23C 30/005* (2013.01); *C23F 17/00* (2013.01); *C21D 2211/002* (2013.01); *C21D 2211/004* (2013.01); *C21D 2211/005* (2013.01); *C21D 2211/009* (2013.01); *Y10T 428/1266* (2015.01); *Y10T 428/12611* (2015.01); *Y10T 428/12618* (2015.01); *Y10T 428/12667* (2015.01); *Y10T 428/12799* (2015.01); *Y10T 428/12951* (2015.01); *Y10T 428/12958* (2015.01); *Y10T 428/12972* (2015.01); *Y10T 428/12993* (2015.01); *Y10T 428/2495* (2015.01); *Y10T 428/24967* (2015.01); *Y10T 428/263* (2015.01); *Y10T 428/264* (2015.01); *Y10T 428/265* (2015.01)

(58) Field of Classification Search
CPC .......... C21D 8/0278; C21D 2211/009; C21D 8/0205; C21D 8/0226; C22C 38/06; C22C 38/04; C22C 38/08; C22C 38/16; C22C 38/18; C22C 38/20; C22C 38/22; C22C 38/24; C22C 38/26; C22C 38/28; C22C 38/14; C22C 38/12; C22C 38/002; C22C 38/02; C22C 38/40; C22C 38/42; C22C 38/44; C22C 38/46; C22C 38/48; C22C 38/50; C23C 2/40; C23C 2/02; C23C 2/06; C23C 30/00; C23C 30/005; C23C 28/023; C23C 28/025; C23C 28/3225; C23F 17/00; B32B 15/013; B32B 15/04; B32B 15/043; B32B 15/18; Y10T 428/12611; Y10T 428/12618; Y10T 428/1266; Y10T 428/12667; Y10T 428/12799; Y10T 428/12951; Y10T 428/12972; Y10T 428/12958; Y10T 428/12993; Y10T 428/2495; Y10T 428/24967; Y10T 428/263; Y10T 428/264; Y10T 428/265
See application file for complete search history.

(56) References Cited

FOREIGN PATENT DOCUMENTS

| | | | |
|---|---|---|---|
| CN | 102333899 A | 1/2012 | |
| CN | 104040011 A | 9/2014 | |
| CN | 104220619 A | 12/2014 | |
| KR | 10-2003-0044429 A | 6/2003 | |
| KR | 10-2011-0083688 A | 7/2011 | |
| KR | 10-2012-0032992 A | 4/2012 | |
| KR | 10-2012-0032995 A | 4/2012 | |
| KR | 10-2013-0018846 A | 2/2013 | |
| KR | 10-2014-0049307 A | 4/2014 | |
| KR | 10-2014-0102308 A | 8/2014 | |
| KR | 10-2014-0138854 A | 12/2014 | |
| WO | WO-2013153679 A1 * | 10/2013 | ........... C21D 8/0226 |

OTHER PUBLICATIONS

European Search Report dated Sep. 5, 2017 issued in European Patent Application No. 14909152.2.
International Search Report dated Aug. 28, 2015 issued in International Patent Application No. PCT/KR2014/012849 (with English translation).

* cited by examiner

[Figure 1]
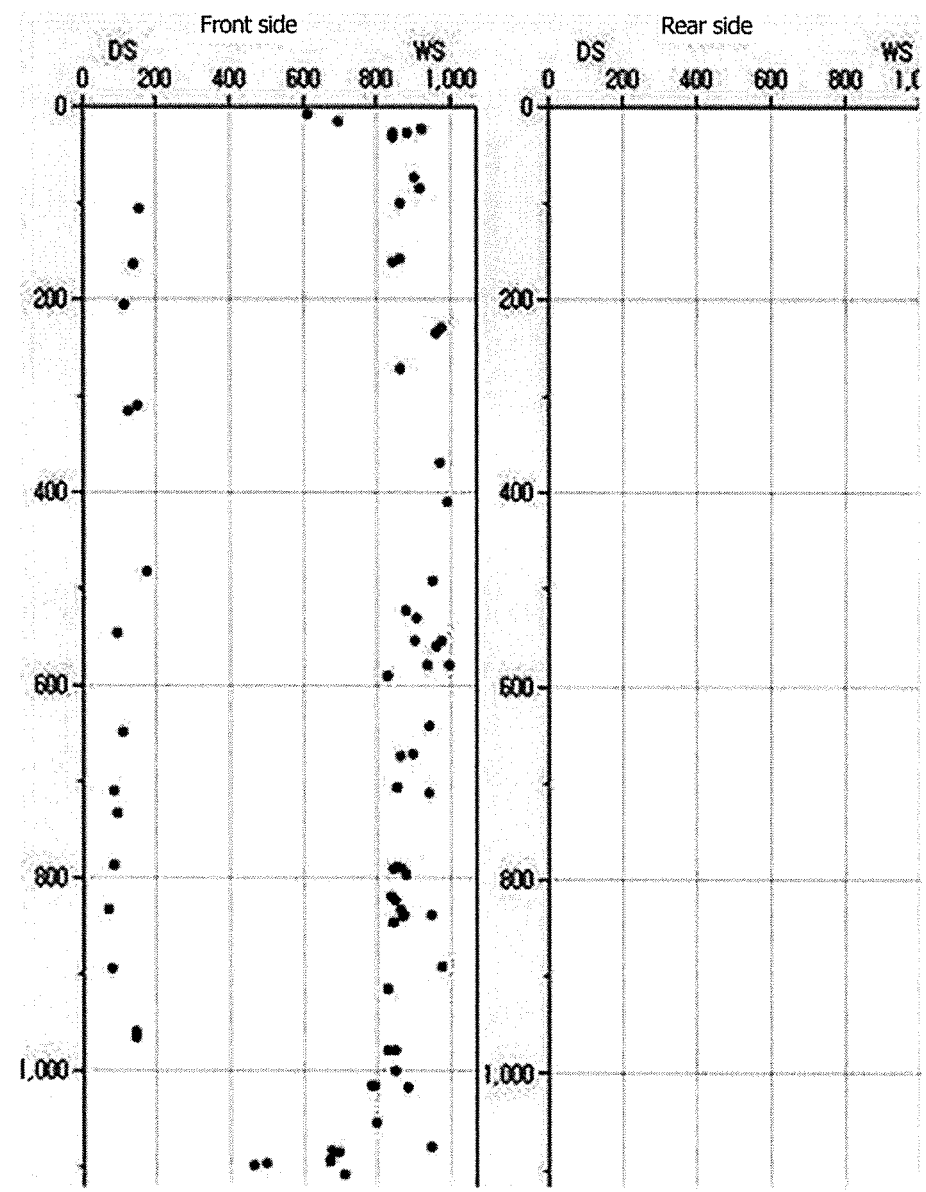

[Figure 2]
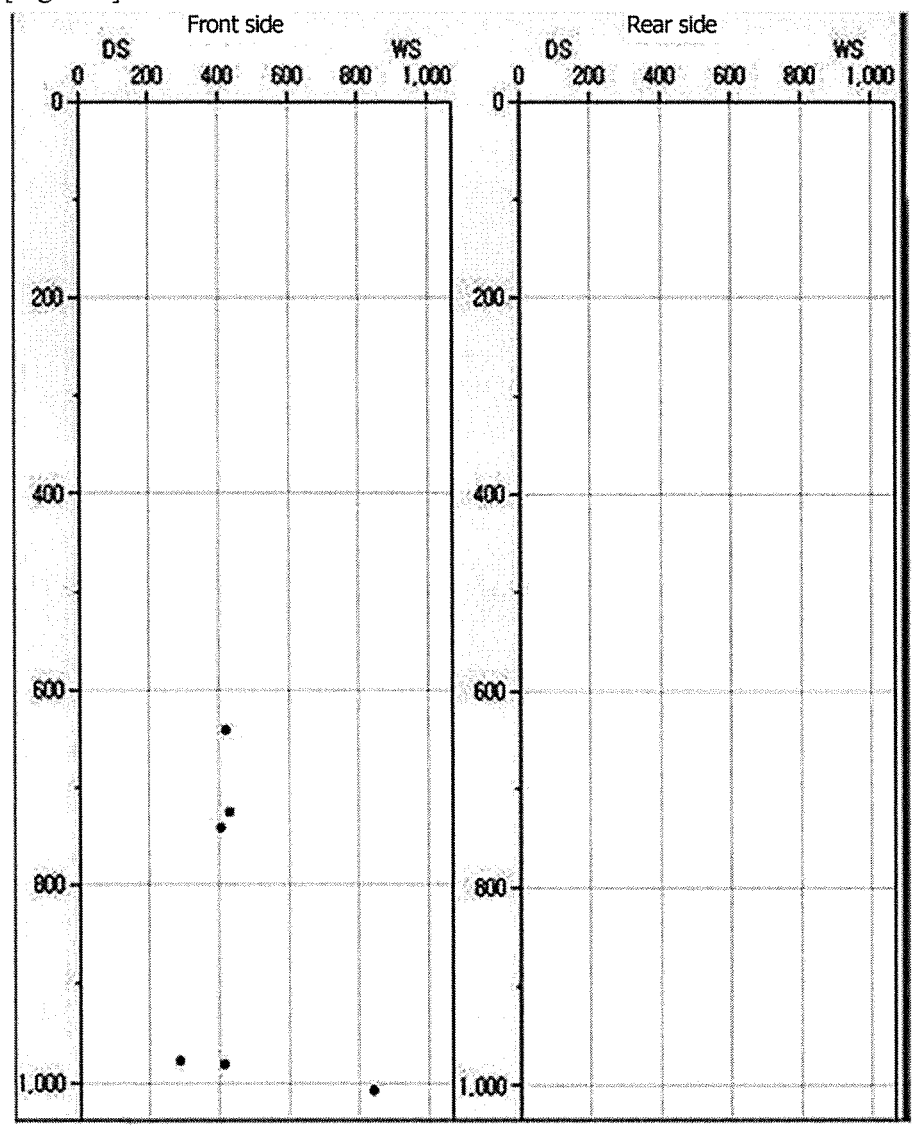

[Figure 3]
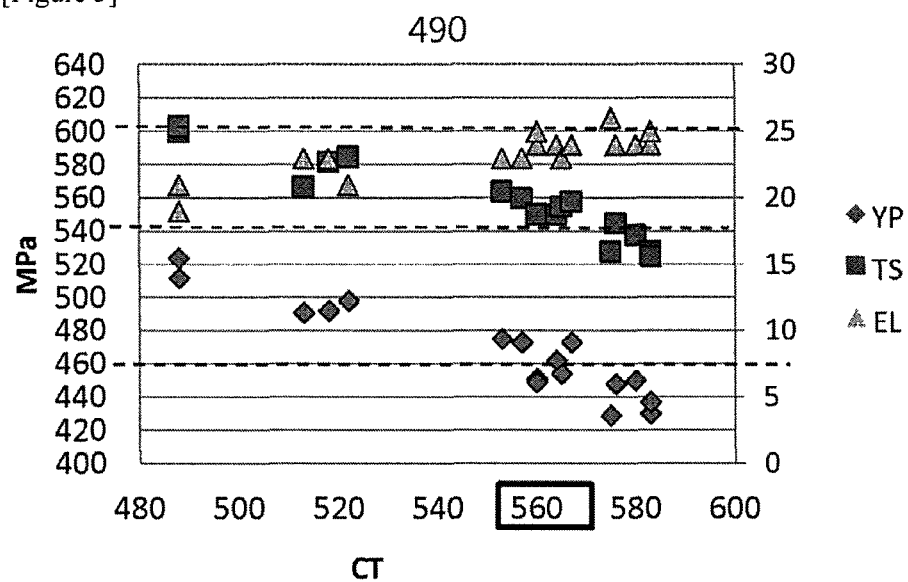

HOT-ROLLED STEEL SHEET FOR HIGH STRENGTH GALVANIZED STEEL SHEET, HAVING EXCELLENT SURFACE QUALITY, AND METHOD FOR PRODUCING SAME

CROSS REFERENCE

This patent application is the U.S. National Phase under 35 U.S.C. § 371 of International Application No. PCT/KR2014/012849, filed on Dec. 24, 2014, which claims the benefit of Korean Patent Application No. 10-2014-0185992, filed on Dec. 22, 2014, the entire contents of each are hereby incorporated by reference.

TECHNICAL FIELD

The present invention relates to a hot-rolled steel sheet and a production method thereof, and more specifically, relates to a high-strength hot-rolled steel sheet having excellent surface quality, which is applied to a base steel sheet of a galvanized steel sheet (hot galvanized iron, HGI), and a production method thereof.

BACKGROUND ART

High-strength galvanized steel sheets (hot galvanized iron, HGI), in which a high-strength hot-rolled steel sheet is used as a base steel sheet, have been widely used as structural materials, etc.

As the high-strength hot-rolled steel sheet which is a base steel sheet of the high-strength galvanized steel sheet, steel species typically containing Nb have been used.

The high-strength hot-rolled steel sheet is produced by heating a steel slab typically containing Nb and hot-rolling it in an austenite region of Ar3 or more, followed by coiling.

However, when the steel slab containing Nb is hot-rolled in the austenite region of Ar3 or more as described above, Nb delays recrystallization on hot-rolling, so that a rolling load of the finishing rolling is increased, and accordingly there is a problem that by generating the rolled surface roughness, poor threading performance and surface defects, particularly, defects such as sand type scales, of the steel sheet occur.

As conventional techniques for improving such surface defects, particularly scale defects, methods for improving scale defects by increasing the number of injections of cooling water, decreasing bar thicknesses or strengthening FSB (finishing scale breaker) conditions, when performing descaling in front of rough rolling, and the like have been known.

However, since the conventional techniques cause hot-rolled threading miss rolls and size changes frequently, they cannot be considered as a fundamental solution.

Therefore, there is a demand for a technique capable of providing a hot-rolled steel sheet, particularly a hot-rolled steel sheet for a galvanized steel sheet, having excellent surface characteristics by solving the problem of surface scale defects without operating problems.

DISCLOSURE

Technical Problem

It is one aspect of the present invention to provide a high-strength hot-rolled steel sheet having excellent surface quality, which is applied to a base steel sheet of the galvanized steel sheet (hot galvanized iron, HGI), and a production method thereof.

Technical Solution

According to one aspect of the present invention, a high-strength hot-rolled steel sheet having excellent surface quality characterized in that it comprises, by weight %, C: 0.05 to 0.15%, Si: 0.03 to 0.10%, Mn: 0.7 to 1.39%, P: 0.001 to 0.05%, S: 0.001 to 0.03%, Al: 0.002 to 0.035%, the remainder Fe and other unavoidable impurities, the weight ratio of Mn/Si is 15 to 25, the weight ratio of C/Si is 1 to 5, and the weight ratio of Si/P is 3 to 10, a microstructure consists of, in an area fraction, 10 to 40% of bainite, 20 to 30% of pearlite and 40% to 60% of ferrite, and a ternary eutectic compound of FeO, $Fe_2SiO_4$ and $Fe_3(PO_4)_2$ is formed within 50 μm from the surface, is provided.

The hot-rolled steel sheet may further comprise, by weight %, one or two or more selected from the group consisting of N: 0.01% or less (excluding 0), Ti: 0.02% or less (excluding 0), Cu: 0.05% or less (excluding 0), Ni: 0.08% or less (excluding 0), Cr: 0.10% or less (excluding 0), V: 0.01% or less (excluding 0) and Mo: 0.03% or less (excluding 0).

The number of sand type scales having a point shape formed on both surfaces of the hot-rolled steel sheet may be an average of 0.1 pieces/$m^3$ or less.

The hot-rolled steel sheet may comprise a zinc plated layer.

The hot-rolled steel sheet may have a tensile strength of 490 MPa or more, a yield strength of 366 MPa or more, and an elongation of 16% or more. For example, the hot-rolled steel sheet may have a tensile strength of 490 to 650 MPa, a yield strength of 366 to 600 MPa, and an elongation of 16 to 30%.

According to another aspect of the present invention, a method for producing a high-strength hot-rolled steel sheet having excellent surface quality is provided, which comprises steps of heating a slab comprising, by weight %, C: 0.05 to 0.15%, Si: 0.03 to 0.10%, Mn: 0.7 to 1.39%, P: 0.001 to 0.05%, S: 0.001 to 0.03%, Al: 0.002 to 0.035%, the remainder Fe and other unavoidable impurities at 1000 to 1250° C., wherein the weight ratio of Mn/Si is 15 to 25 and the weight ratio of C/Si is 1 to 5 and the weight ratio of Si/P is 3 to 10;

rough rolling the heated slab at 990 to 1090° C. to obtain a bar;

finish rolling the bar at a finish rolling temperature of 810 to 910° C. to obtain a hot-rolled steel sheet; and coiling the hot-rolled steel sheet at a coiling temperature of 510 to 610° C.

Advantageous Effects

According to the present invention, it is possible to remarkably reduce the surface scale defects of the hot-rolled steel sheet while securing good physical properties through adjusting contents of each component.

BRIEF DESCRIPTION OF DRAWINGS

FIG. 1 shows the scale number for the hot-rolled steel sheet of Comparative Example 2.

FIG. 2 shows the scale number for the hot-rolled steel sheet of Example 4.

FIG. 3 is a graph showing the physical properties of the hot-rolled steel sheet of the Example 4 according to coiling temperatures.

MODE FOR INVENTION

Hereinafter, the present invention will be described in detail.

As the hot-rolled steel sheet used as a base steel sheet of the high-strength galvanized steel sheet, steel species typically containing Nb have been used.

However, when the steel slab containing Nb is hot-rolled in the austenite region of Ar3 or more to produce the hot-rolled steel sheet as described above, Nb delays recrystallization on hot-rolling, so that a rolling load of the finishing rolling is increased, and accordingly there is a problem that by generating the rolled surface roughness, poor threading performance and surface defects, particularly, defects such as sand type scales, of the steel sheet occur.

Accordingly, the present inventors have accomplished the present invention on the basis of the results of performing studies and experiments for a long time to solve problems that defects such as the scales are generated.

In the present invention, without adding Nb causing the sand type scale defects, the scale defects are improved by suitably controlling contents of Si and Mn, a weight ratio of Mn/Si, a weight ratio of C/Si and a weight ratio of Si/P to secure excellent surface characteristics.

Also, in the present invention, in order to compensate for the strength degradation with no addition of Nb, the high strength is secured by controlling the coiling temperature to form bainite, which is a low temperature structure, as well as the strength is improved through solid solution strengthening by increasing the content of Mn.

That is, the present invention relates to a hot-rolled steel sheet, particularly a hot-rolled steel sheet for a galvanized steel sheet (HGI), having excellent surface characteristics and high strength and a production method thereof.

In one aspect of the present invention, the high-strength hot-rolled steel sheet having excellent surface quality comprises, by weight %, C: 0.05 to 0.15%, Si: 0.03 to 0.10%, Mn: 0.7 to 1.39%, P: 0.001 to 0.05%, S: 0.001 to 0.03%, Al: 0.002 to 0.035%, the remainder Fe and other unavoidable impurities, wherein the weight ratio of Mn/Si is 15 to 25, the weight ratio of C/Si is 1 to 5, and the weight ratio of Si/P is 3 to 10, a microstructure consists of, in an area fraction, 10 to 40% of bainite, 20 to 30% of pearlite and 40% to 60% of ferrite, and a ternary eutectic compound of FeO, $Fe_2SiO_4$ and $Fe_3(PO_4)_2$ is formed within 50 μm from the surface, is provided.

Hereinafter, the composition of the hot-rolled steel sheet will be described.

Carbon (C): 0.05 to 0.15% by Weight

Although carbon is the most effective element to strengthen the steel, it is an element to lower weldability and low temperature toughness, when added in large quantities.

If the content of carbon is too small, it is difficult to realize the target strength to be intended in the present invention.

Besides, if the content of carbon is too large, moldability, weldability, impact properties and low temperature toughness may be deteriorated.

Therefore, the content of carbon may be 0.05 to 0.15% by weight, preferably 0.08 to 0.14% by weight and more preferably 0.11 to 0.13% by weight.

Silicon (Si): 0.03 to 0.10% by Weight

Silicon is used as a deoxidizing agent, improves adhesion of secondary scales and is an effective element for increasing the strength of steel.

As the additive amount of Si increases, surface defects can be remarkably reduced even at the elevated rough rolling temperature, and in particular, when Si is contained in an amount of 0.05% by weight or more, surface defects may hardly occur.

However, if the content of silicon is too large, a red scale may be seriously generated to reduce rather the surface quality.

Therefore, the content of silicon may be 0.03 to 0.10% by weight, preferably 0.04 to 0.08% by weight and more preferably 0.05 to 0.07 wt %.

Manganese (Mn): 0.7 to 1.39% by Weight

Manganese is an effective element to strengthen solid solution of steel.

If the content of manganese is too small, the strength of the steel sheet may be lowered and the coarse MnS is formed, so that the steel material may become very fragile.

However, if the content of manganese is too large, the alloy cost may increase, the weldability may be degraded, and the strength of the steel sheet may excessively increase with low physical properties such as elongation.

Therefore, the content of manganese may be 0.7 to 1.39% by weight, preferably 0.9 to 1.3% by weight and more preferably 1.1 to 1.3% by weight.

Phosphorus (P): 0.001 to 0.05% by Weight

Phosphorus is a component that inhibits cementite formation and is advantageous for improving strength.

If the content of phosphorus content is too small, the strength of the steel sheet may be lowered.

Conversely, if the content of phosphorus is too large, it may be segregated at the center of the steel sheet to lower the impact toughness.

Accordingly, the content of phosphorus may be 0.001 to 0.05% by weight, preferably 0.003 to 0.04% by weight and more preferably 0.005 to 0.02% by weight.

Sulfur (S): 0.001 to 0.03% by Weight

Sulfur is an inevitably contained impurity element, and when contained in a large amount, the impact toughness of steel is greatly damaged by binding it with Mn or the like to form a non-metallic inclusion and thus, it is desirable to suppress the content at most.

Theoretically, it is advantageous to limit the content of sulfur to 0%, but it is inevitably contained in the manufacturing process. Therefore, it is important to manage the upper limit, and in particular, the content of sulfur may be 0.001 to 0.03% by weight, preferably 0.001 to 0.02% by weight and more preferably 0.001 to 0.01% by weight.

Aluminum (Al): 0.002 to 0.035% by Weight

Aluminum is added, together with Si as a deoxidizing agent during steelmaking, and has an effect of strengthening solid solution.

If the content of aluminum is too small, the addition effect cannot be obtained, and on the contrary, if the content of aluminum is too large, clogging of nozzles may be caused during continuous casting.

Therefore, the content of aluminum may be 0.002 to 0.035% by weight, preferably 0.005 to 0.03% by weight and more preferably 0.01 to 0.03% by weight.

Weight Ratio of Mn/Si: 15 to 25

In the present invention, although the contents of Mn and Si are each also important, the ratio of Mn and Si, that is, the weight ratio of Mn/Si is also important.

If the weight ratio of Mn/Si is too small, the surface quality may be lowered or the physical properties such as strength may be lowered.

Conversely, if the weight ratio of Mn/Si is too large, the physical properties such as weldability may be lowered or the steel sheet strength may become excessively high with lowering the physical properties such as elongation.

Thus, the weight ratio of Mn/Si may be 15 to 25, preferably 17 to 23 and more preferably 19 to 21.

Weight Ratio of C/Si: 1 to 5

In the present invention, although the contents of C and Si are each also important, the ratio of C and Si, that is, the weight ratio of C/Si is also important.

If the weight ratio of C/Si is too small, the surface quality may be lowered or the physical properties such as strength may be lowered.

Conversely, if the weight ratio of C/Si is too large, the physical properties such as the surface quality may be lowered or an elongation may be reduced.

Thus, the weight ratio of C/Si may be 1 to 5, preferably 1 to 4 and more preferably 1.5 to 3.

Weight Ratio of Si/P: 3-10 and Ternary Eutectic Compound

Both the Si and P components are easy to thicken on scale and steel interfaces, and the amount of thickening increases as the additive amount increases. However, as the amount of Si increases, dense scales may be formed to reduce surface defects.

When the Si and P are combined and added in the above range, the ternary eutectic compound of FeO, $Fe_2SiO_4$ and $Fe_3(PO_4)$ is formed within 50 μm from the surface to increase the scale peeling force due to the lowering of the melting point, whereby the surface quality may be improved.

To improve the surface characteristics of the steel sheet, the weight ratio of Si/P may be 3 to 10, preferably 3 to 8 and more preferably 5 to 7.

Furthermore, the ternary eutectic compound may be identified with XRD (X-ray diffraction), SEM (scanning electron microscope), EDX (energy dispersive X-ray spectroscopy), XPS (X-ray photoelectron spectroscopy), and the like.

Other Ingredients

In addition to the above-described component elements, to improve the mechanical properties, etc. of the steel sheet, the hot-rolled steel sheet of the present invention may optionally comprise, by weight %, one or two or more selected from the group consisting of N: 0.01% or less (excluding 0), Ti: 0.02% or less (excluding 0), Cu: 0.05% or less (excluding 0), Ni: 0.08% or less (excluding 0), Cr: 0.10% or less (excluding 0), V: 0.01% or less (excluding 0), and Mo: 0.03% or less (excluding 0), if necessary.

Since the nitrogen (N) precipitates fine nitrides by acting on aluminum during the solidification process in the austenite crystal grains to promote the generation of twin crystals, it improves strength and ductility on molding the steel sheet, but as the content of nitrogen increases, the nitrides are excessively precipitated to lower hot workability and elongation, so that the content of nitrogen is preferably limited to 0.01 wt % or less.

When the Cr is added, the effect of accelerating the internal oxidation of Si can be obtained, but if the Cr content is too large, the Cr may be rather externally oxidized to deteriorate plating properties. Therefore, the Cr content is preferably 0.10% by weigh or less.

When the Mo is added, the effect of increasing the strength can be obtained, and the effect of accelerating the internal oxidation of Si can be obtained on combination with Ni and/or Cu and addition, but if the content of Mo is too large, the rising cost may be caused. Therefore, the Mo content is preferably 0.03% by weight or less.

When the Ti is added, the effect of increasing the strength can be obtained but if the Ti content is too large, the deterioration of the plating properties can be caused. Therefore, the Ti content is preferably 0.02% by weight or less.

When the Cu is added, the residual gamma phase formation can be promoted, and the effect of accelerating the internal oxidation of Si can be obtained on combination with Ni and/or Mo and addition, but if the Cu content is too large, the rising cost may be caused. Therefore, the Cu content is preferably 0.05 wt % or less.

When the Ni is added, the residual gamma phase formation can be promoted, and the effect of accelerating the internal oxidation of Si can be obtained on combination with Cu and/or Mo and addition, but if the Ni content is too large, the rising cost may be caused. Therefore, the Ni content is preferably 0.08% by weight or less.

When the V is added, it is an element which is advantageous for improving the yield strength by grain refinement and increasing wettability of steel. However, if the content is too large, the toughness of steel is deteriorated and cracks are in danger of being generated in the welded portion, so that the content of V is preferably 0.01% or less.

The remaining component may be iron (Fe) and other unavoidable impurities may be included. In typical hot-rolled steel sheet manufacturing processes, impurities which are not intended from the raw materials or the surrounding environment may be inevitably incorporated, so that they cannot be excluded. Since any one of person having ordinary skill in the art can know these impurities, their entities are not specifically mentioned in this specification.

Microstructure

The hot-rolled steel sheet of the present invention has a microstructure consisting of 10 to 40% of bainite, 20 to 30% of pearlite and 40 to 60% of ferrite in an area fraction.

If the content of bainite is too large, the strength is improved, but the elongation is lowered due to the low content of ferrite, and if the content is too small, the strength is lowered due to the high content of ferrite, so that the content of bainite is limited to 10 to 40% in an area fraction. Preferably, it may be 20 to 40%.

Scale Number

The number of sand type scales having a point shape formed on both surfaces (front side+rear side) of the hot-rolled steel sheet according to the present invention may be an average of 0.1 pieces/$m^3$ or less, preferably 0.08 pieces/$m^3$ or less and more preferably 0.06 pieces/$m^3$ or less. It may be an average of 100 pieces or less, preferably 80 pieces or less and more preferably 60 pieces or less, on the basis of an area having a size with a length of 1 km and a width of 1066 mm. The number of scales can be measured using an SDD (Surface Defect Detector).

The scale may be mainly a sand type scale. The sand type scale is a surface defect, which occurs in the hot rolling process, occurs as if sand is sprinkled on the plate with a relatively round dot shape, occurs sporadically on the width front with a relatively shallow depth, and shows blackish brown. If the sand type scale is present, plating and coating failures may occur, and evolve into surface cracks during processing, thereby resulting in surface failure.

In the present invention, surface scale defects of the hot-rolled steel sheet can be remarkably reduced through controlling contents of the steel sheet components.

Strength and Elongation

The hot-rolled steel sheet according to the present invention may have a tensile strength of 490 MPa or more, a yield strength of 366 MPa or more and an elongation of 16% or more. For example, the hot-rolled steel sheet may have a tensile strength of 490 to 650 MPa, a yield strength of 366 to 600 MPa and an elongation of 16% to 30%.

Plated Steel Sheet

The hot-rolled steel sheet according to the present invention may comprise a zinc plated layer.

The hot-rolled steel sheet comprising a zinc plated layer as described above may be, for example, a galvanized steel sheet such as HGI.

Sheet Thickness, etc.

The hot-rolled steel sheet according to the present invention may have a thickness of 1.0 to 5 mm and preferably 1.0 to 1.6 mm. The steel sheet according to the present invention may have a width of 500 to 2000 mm and a coil weight of 5 to 40 tons.

Hereinafter, a method for producing the hot-rolled steel sheet of the present invention will be described.

The method for producing a high-strength hot-rolled steel sheet, which is another aspect of the present invention, comprises steps of heating a slab comprising, by weight %, C: 0.05 to 0.15%, Si: 0.03 to 0.10%, Mn: 0.7 to 1.39%, P: 0.001 to 0.05%, S: 0.001 to 0.03%, Al: 0.002 to 0.035%, the remainder Fe and other unavoidable impurities at 1000 to 1250° C., wherein the weight ratio of Mn/Si is 15 to 25 and the weight ratio of C/Si is 1 to 5 and the weight ratio of Si/P is 3 to 10;

rough rolling the heated slab at 990 to 1090° C. to obtain a bar;

finish rolling the bar at a finish rolling temperature of 810 to 910° C. to obtain a hot-rolled steel sheet; and coiling the hot-rolled steel sheet at a coiling temperature of 510 to 610° C.

On hot rolling, threading performance and surface quality are in an opposite relationship. Specifically, to secure the threading performance, it is preferred to increase the slab heating temperature, the rough rolling temperature (RDT), and the bar thickness. Conversely, to secure the surface quality, it is preferred to lower an extraction temperature and the RDT and strengthen the descaling.

The slab heating temperature (heating furnace extraction temperature, SRT) may be 1000 to 1250° C., preferably 1100 to 1220° C. and more preferably 1150 to 1200° C.

If the slab heating temperature is too low, the threading performance may be deteriorated, and if the slab heating temperature is too high, the surface quality may be deteriorated.

The rough rolling temperature (RDT) may be 990 to 1090° C., preferably 1010 to 1070° C. and more preferably 1030 to 1050° C.

If the rough rolling temperature is too low, the threading performance may be deteriorated, and if the rough rolling temperature is too high, the surface quality may be deteriorated.

The finish rolling temperature (FDT) may be 810 to 910° C., preferably 830 to 890° C. and more preferably 850 to 870° C.

If the finish rolling temperature is too low, the deformation resistance may increase and the threading performance may be deteriorated, and if it is too high, recrystallization is delayed due to precipitation and scales are generated, so that the surface quality may be deteriorated. In the present invention, a rolling load (roll force) is similar to the existing one, but the actual rolling temperature is lower than that of the existing product, whereby it is advantageous to reduce scales.

In addition, the finish rolling can be carried out under the conditions of an average deformation resistance of 250 to 500 MPa, preferably 300 to 450 MPa and more preferably 350 to 450 MPa. If the average deformation resistance is too small, recrystallization is delayed due to precipitation and scales are generated, so that the surface quality may be deteriorated, and if the average deformation resistance is too large, the threading performance may be deteriorated.

The coiling temperature (CT) may be 510 to 610° C., preferably 530 to 590° C. and more preferably 550 to 570° C.

After the hot-rolled steel sheet is obtained by the finish rolling as described above, it is cooled to the above coiling temperature, that is, 510 to 610° C., and then coiled.

By cooling to the coiling temperature as described above, a bainite phase, which is a low temperature structure, is formed.

If the coiling temperature is too low, the amount of bainite formation may be very large to lower the elongation, and if the coiling temperature is too high, the amount of bainite formation is too small and the ferrite content is relatively large, so that the strength may be reduced.

The method for producing a hot-rolled steel sheet according to the present invention may further comprise a step of forming a zinc plated layer after hot rolling.

The zinc plated layer may be a hot-dip galvanized layer.

In the case of producing a plated steel sheet according to the present invention, a heat treatment may be performed before plating, and for example, in a primary heating section, the steel sheet may be heated to 340 to 440° C. and in a secondary heating section, the steel sheet may be heated to 400 to 500° C. The secondary heating can be performed by an induction heating method.

Hereinafter, the present invention will be described in more detail by way of examples.

EXAMPLES

For a slab having a composition in the following Table 1, it was hot-rolled under the conditions of a slab heating temperature of 1170° C., a rough rolling temperature of 1040° C., a finish rolling temperature of 860° C. and an average deformation resistance of about 400 MPa and coiled under the condition of 560° C. to prepare a hot-rolled steel sheet.

TABLE 1

|  | C | Si | Mn | P | S | Nb | Al | Ti | Mn/Si | C/Si | Si/P |
|---|---|---|---|---|---|---|---|---|---|---|---|
| Com. Ex. 1 | 0.16 | 0.02 | 0.8 | 0.01 | 0.005 | 0 | 0.015 | — | 40 | 8 | 2 |
| Com. Ex. 2 | 0.13 | 0.02 | 0.9 | 0.01 | 0.005 | 0.015 | 0.015 | — | 45 | 6.5 | 2 |
| Com. Ex. 3 | 0.13 | 0.02 | 0.2 | 0.010 | 0.005 | 0.015 | 0.015 | — | 10.0 | 6.5 | 2.0 |
| Example 1 | 0.12 | 0.06 | 0.9 | 0.010 | 0.005 | 0 | 0.015 | 0.01 | 15.0 | 2.0 | 6.0 |
| Example 2 | 0.12 | 0.06 | 1.0 | 0.008 | 0.005 | 0 | 0.015 | 0.02 | 16.7 | 2.0 | 7.5 |

TABLE 1-continued

|  | C | Si | Mn | P | S | Nb | Al | Ti | Mn/Si | C/Si | Si/P |
|---|---|---|---|---|---|---|---|---|---|---|---|
| Example 3 | 0.12 | 0.05 | 1.1 | 0.009 | 0.005 | 0 | 0.015 | — | 22.0 | 2.4 | 5.5 |
| Example 4 | 0.12 | 0.06 | 1.2 | 0.010 | 0.005 | 0 | 0.015 | — | 20.0 | 2.0 | 6.0 |
| Example 5 | 0.12 | 0.07 | 1.3 | 0.011 | 0.005 | 0 | 0.015 | — | 18.6 | 1.7 | 6.3 |

(Com. Ex.: Comparative Example)

Surface qualities, shapes, threading performances, correction recovery rates, plating properties, etc. of the hot-rolled steel sheets according to Examples and Comparative Examples were measured, respectively, and the results are shown in Table 2.

Surface Quality

The surface quality was measured by using an SDD and FGS (Ferrite Grain Size), and the evaluation criteria are as follows.
◎: scale number on the SDD 0.06 pieces/m³ or less
○: scale number on the SDD 0.07 pieces/m³ or less
Δ: scale number on the SDD more than 0.07 pieces/m³

Shape

The shape was evaluated through a visual confirmation, and the evaluation criteria are as follows.
◎: wave height within 2 mm
○: wave height within 2 to 7 mm
Δ: wave height 9 mm or more Threading Performance The threading performance was evaluated by determining twist occurrence with the naked eye, and the evaluation criteria are as follows.
◎: twist non-occurrence
Δ: twist occurrence Plating Property The plating property was evaluated via surface grade, and the evaluation criteria are as follows.
○: surface grade within a grade 4
Δ: surface grade a grade 5 or more Structure The area fraction of the microstructure was measured using an EBSD (Electro Back Scatter Deflector).

Ternary Eutectic

It was determined using an XRD whether the ternary eutectic was formed.
○: formed
x: not formed According to Table 2, the physical properties of the hot-rolled steel sheets according to Examples 1 to 5 were superior to those of Comparative Examples, and in particular the surface quality, the threading performance and the correction recovery rate were excellent.

Since the Si content was too low and the Mn content was low, in Comparative Examples 1 to 3, and particularly, an excessive amount of Nb was contained in Comparative Examples 2 to 3, the weight ratio of Mn/Si was too high in Comparative Examples 1 and 2 and the weight ratio of Mn/Si was too low in Comparative Example 3, the physical properties such as surface quality were lowered. In addition, in Comparative Examples, the Si content was low, so that the ternary eutectic was not formed.

Furthermore, as a result of measuring the microstructure using the EBSD, the steel sheet of Examples consisted of 30% of bainite, 25% of pearlite and 45% of ferrite in an area fraction of the microstructure.

FIG. 1 shows the scale number for the hot-rolled steel sheet of Comparative Example 2 and FIG. 2 shows the scale number for the hot-rolled steel sheet of Example 4, where on the basis of an area having a size with a length of 1 km and a width of 1066 mm, 76 scales were present in the steel sheet of Comparative Example 2, but 6 scales were confirmed in the steel sheet of Example 4. In FIG. 1, the x-axis represents the width (mm) and the y-axis represents the length (m).

The change in physical properties according to the coiling temperature (CT) was observed, and the results were shown in Table 3 and FIG. 3 below.

In Table 3 below, Comparative Example 4 is one using the steel sheet of Comparative Example 1, Comparative Example 5 is one using the steel sheet of Comparative Example 2, and Comparative Example 6 and Examples 6 to 8 are those using the steel sheet of Example 4.

In Table 3 below, the tensile strength (TS), the yield strength (YP) and the elongation (EL) were measured, according to the tensile test method for metallic materials

TABLE 2

|  | Surface quality | Shape | Threading performance | Plating property | Structure | Ternary eutectic |
|---|---|---|---|---|---|---|
| Comparative Example 1 | ○ | ○ | ○ | ○ | — | x |
| Comparative Example 2 | Δ | ○ | Δ | ○ | — | x |
| Comparative Example 3 | Δ | ○ | Δ | ○ | — | x |
| Example 1 | ◎ | ○ | ◎ | ○ | Ferrite 45% Pearlite 25% Bainite 30% | ○ |
| Example 2 | ◎ | ○ | ◎ | ○ | Ferrite 45% Pearlite 25% Bainite 30% | ○ |
| Example 3 | ◎ | ○ | ◎ | ○ | Ferrite 45% Pearlite 25% Bainite 30% | ○ |
| Example 4 | ◎ | ○ | ◎ | ○ | Ferrite 45% Pearlite 25% Bainite 30% | ○ |
| Example 5 | ◎ | ○ | ◎ | ○ | Ferrite 45% Pearlite 25% Bainite 30% | ○ | prescribed in Japanese Industrial Standard JIS Z 2241, using Test Specimen No. 5 specified in JIS Z 2201.

TABLE 3

|  | CT (° C.) | YP (MPa) | TS (MPa) | EL (%) |
|---|---|---|---|---|
| Comparative Example 4 | 500 | 471 | 583 | 22 |
| Comparative Example 5 | 580 | 478 | 545 | 26 |
| Comparative Example 6 | 480 | 518 | 602 | 20 |
| Example 6 | 520 | 494 | 578 | 22 |
| Example 7 | 560 | 458 | 552 | 24 |
| Example 8 | 580 | 441 | 534 | 24 |

FIG. 3 is a graph showing the physical properties (tensile strength, yield strength and elongation) of the hot-rolled steel sheet of Example 4 according to the coiling temperature, and the dotted line in FIG. 3 represents the average value of Comparative Example 2.

As shown in Table 3 and FIG. 3, it can be seen that excellent tensile strength (TS), yield strength (YP) and elongation (EL) characteristics can be obtained when coiling at the coiling temperature according to the present invention.

The invention claimed is:

1. A high-strength hot-rolled steel sheet having excellent surface quality characterized in that it comprises, by weight %, C: 0.05 to 0.15%, Si: 0.03 to 0.10%, Mn: 0.7 to 1.39%, P: 0.001 to 0.05%, S: 0.001 to 0.03%, Al: 0.002 to 0.035%, the remainder Fe and other unavoidable impurities, wherein the weight ratio of Mn/Si is 15 to 25, the weight ratio of C/Si is 1 to 5, and the weight ratio of Si/P is 3 to 10, a microstructure consists of, in an area fraction, 10 to 40% of bainite, 20 to 30% of pearlite and 40% to 60% of ferrite, and a ternary eutectic compound of FeO, $Fe_2SiO_4$ and $Fe_3(PO_4)_2$ is formed within 50 μm from the surface of the steel sheet.

2. The high-strength hot-rolled steel sheet having excellent surface quality according to claim 1, characterized in that said steel sheet further comprises, by weight %, one or two or more selected from the group consisting of N: 0.01% or less (excluding 0), Ti: 0.02% or less (excluding 0), Cu: 0.05% or less (excluding 0), Ni: 0.08% or less (excluding 0), Cr: 0.10% or less (excluding 0), V: 0.01% or less (excluding 0) and Mo: 0.03% or less (excluding 0).

3. The high-strength hot-rolled steel sheet having excellent surface quality according to claim 1, characterized in that the number of sand type scales having a point shape formed on both surfaces of said steel sheet is an average of 0.1 pieces/m$^3$ or less.

4. The high-strength hot-rolled steel sheet having excellent surface quality according to claim 1, characterized in that said steel sheet comprises a zinc plated layer formed on the steel sheet.

5. The high-strength hot-rolled steel sheet having excellent surface quality according to claim 1, characterized in that said steel sheet has a tensile strength of 490 to 650 MPa, a yield strength of 366 to 600 MPa, and an elongation of 16 to 30%.

6. A method for producing a high-strength hot-rolled steel sheet having excellent surface quality, comprising steps of
heating a slab comprising, by weight %, C: 0.05 to 0.15%, Si: 0.03 to 0.10%, Mn: 0.7 to 1.39%, P: 0.001 to 0.05%, S: 0.001 to 0.03%, Al: 0.002 to 0.035%, the remainder Fe and other unavoidable impurities at 1000 to 1250.degree. C., wherein the weight ratio of Mn/Si is 15 to 25 and the weight ratio of C/Si is 1 to 5 and the weight ratio of Si/P is 3 to 10;
rough rolling the heated slab at 990 to 1090° C. to obtain a bar;
finish rolling said bar at a finish rolling temperature of 810 to 910° C. to obtain a hot-rolled steel sheet; and
coiling said hot-rolled steel sheet at a coiling temperature of 510 to 610° C.,
wherein a microstructure consists of, in an area fraction, 10 to 40% of bainite, 20 to 30% of pearlite and 40% to 60% of ferrite, and a ternary eutectic compound of FeO, $Fe_7SiO_4$ and $Fe_3(PO_4)_2$ is formed within 50 μm from the surface of the steel sheet.

7. The method for producing a high-strength hot-rolled steel sheet having excellent surface quality according to claim 6, characterized in that said slab further comprises, by weight %, one or two or more selected from the group consisting of N: 0.01% or less (excluding 0), Ti: 0.02% or less (excluding 0), Cu: 0.05% or less (excluding 0), Ni: 0.08% or less (excluding 0), Cr: 0.10% or less (excluding 0), V: 0.01% or less (excluding 0) and Mo: 0.03% or less (excluding 0).

8. The method for producing a high-strength hot-rolled steel sheet having excellent surface quality according to claim 6, characterized in that said coiling temperature is 550 to 570° C.

9. The method for producing a high-strength hot-rolled steel sheet having excellent surface quality according to claim 6, further comprising a step of forming a zinc plated layer on the steel sheet after said coiling step.

* * * * *